(12) United States Patent
Shan et al.

(10) Patent No.: US 10,144,620 B2
(45) Date of Patent: Dec. 4, 2018

(54) METHOD AND SYSTEM FOR POSITIONING ENGINEERING MACHINERY WORK OBJECTS

(71) Applicant: XUZHOU HEAVY MACHINERY CO., LTD., Jiangsu (CN)

(72) Inventors: Zenghai Shan, Jiangsu (CN); Changjian Zhu, Jiangsu (CN); Zhongxiang Zhao, Jiangsu (CN); Quan Li, Jiangsu (CN); Maofeng Zhu, Jiangsu (CN)

(73) Assignee: XUZHOU HEAVY MACHINERY CO., LTD., Xuzhou City (CN)

( * ) Notice: Subject to any disclaimer, the term of this patent is extended or adjusted under 35 U.S.C. 154(b) by 0 days.

(21) Appl. No.: 15/507,931

(22) PCT Filed: Sep. 5, 2014

(86) PCT No.: PCT/CN2014/085988
§ 371 (c)(1),
(2) Date: Mar. 1, 2017

(87) PCT Pub. No.: WO2015/135309
PCT Pub. Date: Sep. 17, 2015

(65) Prior Publication Data
US 2017/0283223 A1 Oct. 5, 2017

(51) Int. Cl.
*B66C 13/46* (2006.01)
*B66C 13/40* (2006.01)
(Continued)

(52) U.S. Cl.
CPC .............. *B66C 13/46* (2013.01); *B66C 13/40* (2013.01); *B66C 13/48* (2013.01); *G01S 19/41* (2013.01)

(58) Field of Classification Search
None
See application file for complete search history.

(56) References Cited

U.S. PATENT DOCUMENTS

2010/0070179 A1* 3/2010 Cameron .............. G01S 5/0027
701/301
2011/0187548 A1 8/2011 Maynard et al.
(Continued)

FOREIGN PATENT DOCUMENTS

CN 1570796 1/2005
CN 101037174 9/2007
(Continued)

*Primary Examiner* — Chico A Foxx
(74) *Attorney, Agent, or Firm* — Myers Bigel, P.A.

(57) ABSTRACT

The present disclosure discloses a method and system for positioning an engineering machinery work object. The method comprises: a reference station collects in real time satellite positioning information as a reference station current measurement value D0, and transmits D0 to first and second mobile stations; the first mobile station and the second mobile station respectively collect in real time satellite positioning information as a first mobile station current measurement value D1 and a second mobile station current measurement value D2, and respectively perform dynamic differential processes on D0 and D1 and D0 and D2 to obtain relative coordinate information of the first mobile station and the second mobile station; a crane resolving unit determines the boom extension length, the boom pitch angle and boom rotating angle based on the relative coordinate information of the first mobile station and the second mobile station; based on the boom extension length, the boom pitch angle and the boom rotating angle, a crane controller controls the boom to move to a hoisting position of the object to hoist the object. The present disclosure can greatly increase the precision of positioning the work object, and (Continued)

can also automatically track the boom to avoid errors and risks resulting from visual adjustment.

15 Claims, 6 Drawing Sheets

(51) Int. Cl.
  *B66C 13/48* (2006.01)
  *G01S 19/41* (2010.01)

(56) References Cited

U.S. PATENT DOCUMENTS

2012/0308354 A1* 12/2012 Tafazoli Bilandi ..... E02F 9/264 414/685

2013/0161279 A1* 6/2013 Schneider ............... B66C 13/06 212/273
2016/0031683 A1* 2/2016 Fenker .................... B66C 13/40 212/276

FOREIGN PATENT DOCUMENTS

| | | |
|---|---|---|
| CN | 101750620 | 6/2010 |
| CN | 102452617 | 5/2012 |
| CN | 102471040 | 5/2012 |
| CN | 102502406 | 6/2012 |
| CN | 104310224 | 1/2015 |
| EP | 2 378 031 | 10/2011 |
| JP | 2001153943 | 6/2001 |
| JP | 2002080198 | 3/2002 |
| JP | 2006044932 | 2/2006 |

* cited by examiner

METHOD AND SYSTEM FOR POSITIONING ENGINEERING MACHINERY WORK OBJECTS

RELATED APPLICATIONS

The present application is a 35 U.S.C. § 371 national phase application of PCT International Application No. PCT/CN2014/085988, filed Sep. 5, 2014; the disclosure of which is hereby incorporated herein by reference in its entirety.

FIELD OF THE INVENTION

The present disclosure relates to a method and system for positioning an engineering machinery work object.

BACKGROUND OF THE INVENTION

During an operation of a crane, in particular in case of remote hoisting operation or crossing operation over a certain obstacle, due to a visual error of the operator, an accurate position of the object to be hoisted cannot be precisely determined. If the object deviates from the crane hook in the vertical direction, "slant pulling" would occur, which would cause damages to the crane, or even cause an overthrow accident.

At present, hoist of a large-scale weight usually needs careful on-site investigation and calculation. Job conditions including boom extension length, boom pitch angle and the like are estimated in advance. Moreover, at the operation site, the hoisting operation needs command and dispatch by field staff, and is completed by means of visual measurement and experience of the operator. The field operation usually needs coordination by multiple persons through repeated adjustments, which increases uncertainty and hoisting duration of the operation. In particular in case of a complex operation condition such as at night and in a rainy and snowy weather, the difficulty in command and operation by the field staff is increased.

The existing technology mainly has the following two shortcomings:

Firstly, the wireless positioning precision of the object point is low. Since high-precision wireless positioning is not opened, and only civil pseudocodes are available, the precision for the object point positioning is about 10 m. The boom extension length and the boom pitch angle as calculated differ greatly from the actual dimensions, and it cannot be determined accurately the accurate position of the object. If the object deviates from the crane hook in the vertical direction, "slant pulling" would occur, which would cause damages to the crane, or even cause an overthrow accident.

Secondly, execution action by the boom is unclear. In the existing solutions, the execution action by the boom mainly depends on command and dispatch by field staff, and is completed by means of visual measurement and experience of the operator. In case of an operation condition with remote hoisting or crossing over a certain obstacle, due to a visual error of the operator, an accurate position of the object to be hoisted cannot be precisely determined. The hoisting height and hoisting angle are fully determined by visual measurement and experience, which increases the risk.

BRIEF SUMMARY OF THE INVENTION

In view of the above technical problems, the present disclosure provides a method and system for positioning an engineering machinery work object, which adopts a real-time dynamic differentiation measurement method to greatly increase the positioning precision of the work object.

According to one aspect of the present disclosure, a method for positioning an engineering machinery work object is provided, which comprises:

collecting in real time, by a reference station, satellite positioning information as a reference station current measurement value D0, and transmitting D0 to a first mobile station and a second mobile station, wherein the reference station is disposed at the rotating shaft center of a crane, the first mobile station is disposed at the hoisting position of an objected to be hoisted, and the second mobile station is disposed at the vehicle head of the crane;

collecting in real time, by the first mobile station, satellite positioning information as a first mobile station current measurement value D1, performing real-time kinematic processes on D0 and D1 to obtain relative coordinate information of the first mobile station, and transmitting the relative coordinate information of the first mobile station to a crane resolving unit;

collecting in real time, by the second mobile station, satellite positioning information as a second mobile station current measurement value D2, performing real-time kinematic processes on D0 and D2 to obtain relative coordinate information of the second mobile station, and transmitting the relative coordinate information of the second mobile station to the crane resolving unit;

determining, by the crane resolving unit, the boom extension length, the boom pitch angle and the boom rotating angle based on the relative coordinate information of the first mobile station and the relative coordinate information of the second mobile station;

controlling, by the crane controller, based on the boom extension length, the boom pitch angle and the boom rotating angle, the boom to move to the hoisting position of the object to hoist the object.

In one example of the present disclosure, after the step of determining, by the crane resolving unit, the boom extension length, the boom pitch angle and the boom rotating angle based on the relative coordinate information of the first mobile station and the relative coordinate information of the second mobile station, further comprising:

determining whether the boom extension length, the boom pitch angle and the boom rotating angle are within the respective predetermined ranges of hoisting height, boom pitch angle and boom rotating angle;

if it is determined that the boom extension length, the boom pitch angle and the boom rotating angle are not within the respective predetermined ranges of hoisting height, boom pitch angle and boom rotating angle, outputting alarm information;

if it is determined that the boom extension length, the boom pitch angle and the boom rotating angle are within the respective predetermined ranges of hoisting height, boom pitch angle and boom rotating angle, controlling, by the crane controller, based on the boom extension length, the boom pitch angle and the boom rotating angle, the boom to move to the hoisting position of the object to hoist the object.

In one example of the present disclosure, the step of determining, by the crane resolving unit, the boom extension length, the boom pitch angle and the boom rotating angle based on the relative coordinate information of the first mobile station and the relative coordinate information of the second mobile station further comprises:

determining, by the crane resolving unit, the boom extension length and the boom pitch angle based on the relative coordinate information of the first mobile station;

determining, by the crane resolving unit, the boom rotating angle based on the relative coordinate information of the first mobile station and the relative coordinate information of the second mobile station.

In one example of the present disclosure, the step of controlling, by the crane controller, based on the boom extension length, the boom pitch angle and the boom rotating angle, the boom to move to the hoisting position of the object to hoist the object comprises:

during the process of controlling the boom to move to the hoisting position of the object, determining whether current boom pitch angle collected by a main arm angle sensor is within the predetermined range of boom pitch angle;

if the current boom pitch angle is not within the predetermined range of boom pitch angle, modifying the amplitude so as to adjust current boom pitch angle to one angle within the predetermined range of boom pitch angle;

if the current boom pitch angle is within the predetermined range of boom pitch angle, determining whether current rotating angle collected by a rotating angle encoder is within the predetermined range of boom rotating angle;

if the current rotating angle is not within the predetermined range of boom rotating angle, rotating the boom so as to adjust the current rotating angle to one angle within the predetermined range of boom rotating angle;

if the current rotating angle collected by a rotating angle encoder is within a predetermined range of boom rotating angle, determining whether current extension length collected by a length sensor is within the predetermined range of boom extension length;

if the current extension length is not within the predetermined range of boom extension length, extending the boom frame so as to adjust the current extension length to one length within the predetermined range of boom extension length;

if the current extension length is within the predetermined range of boom extension length, hoisting the object.

In one example of the present disclosure, said method further comprises: the reference station transmits a known precise coordinate of the reference station to the first mobile station and the second mobile station; the first mobile station acquires a precise coordinate of the first mobile station based on the known precise coordinate of the reference station and the relative coordinate information of the first mobile station and transmits the precise coordinate of the first mobile station to the crane resolving unit; the second mobile station acquires a precise coordinate of second mobile station based on the known precise coordinate of the reference station and the relative coordinate information of the second mobile station and transmits the precise coordinate of the second mobile station to the crane resolving unit.

According to another aspect of the present disclosure, an engineering machinery work object positioning system is provided, comprising a reference station, a first mobile station, a second mobile station, a crane resolving unit and a crane controller, wherein the reference station is disposed at the center of the crane rotating shaft, the first mobile station is disposed at the hoisting position of the object, and the second mobile station is disposed at the vehicle head of the crane, wherein:

the reference station is used for collecting in real time satellite positioning information as a reference station current measurement value D0, and transmitting D0 to the first mobile station and the second mobile station;

the first mobile station is used for collecting in real time satellite positioning information as a first mobile station current measurement value D1, performing real-time kinematic processes on D0 and D1 to obtain relative coordinate information of the first mobile station, and transmitting the relative coordinate information of the first mobile station to the crane resolving unit;

the second mobile station is used for collecting in real time satellite positioning information as a second mobile station current measurement value D2, performing real-time kinematic processes on D0 and D2 to obtain relative coordinate information of the second mobile station, and transmitting the relative coordinate information of the second mobile station to the crane resolving unit;

the crane resolving unit is used for determining the boom extension length, the boom pitch angle and the boom rotating angle based on the relative coordinate information of the first mobile station and the relative coordinate information of the second mobile station;

the crane controller is used for controlling based on the boom extension length, the boom pitch angle and the boom rotating angle, the boom to move to the hoisting position of the object to hoist the object.

In one example of the present disclosure, the crane resolving unit is further used for, after determining the boom extension length, the boom pitch angle and the boom rotating angle based on the relative coordinate information of the first mobile station and the relative coordinate information of the second mobile station, determining whether the boom extension length, the boom pitch angle and the boom rotating angle are within predetermined ranges of hoisting height, boom pitch angle and boom rotating angle, if the boom extension length, the boom pitch angle and the boom rotating angle are not within the predetermined ranges of hoisting height, boom pitch angle and boom rotating angle, outputting alarm information, and if the boom extension length, the boom pitch angle and the boom rotating angle are within the predetermined ranges of hoisting height, boom pitch angle and boom rotating angle, instructing the crane controller to execute the operation of controlling the boom to move to the hoisting position of the object and hoist the object based on the boom extension length, the boom pitch angle and the boom rotating angle.

In one example of the present disclosure, the crane resolving unit comprises a first resolving module and a second resolving module, wherein:

the first resolving module is used for determining the boom extension length and the boom pitch angle based on the relative coordinate information of the first mobile station;

the second resolving module is used for determining the boom rotating angle based on the relative coordinate information of the first mobile station and the relative coordinate information of the second mobile station.

In one example of the present disclosure, the crane controller comprises a first identification module, a second identification module, a third identification module and an execution module, wherein:

the first identification module is used for identifying whether current boom pitch angle collected by a main arm angle sensor is within the predetermined range of boom pitch angle;

the second identification module is used for identifying whether the current rotating angle collected by a rotating angle encoder is within the predetermined range of boom rotating angle in case that the first identification module identifies that the current boom pitch angle is within the predetermined range of boom pitch angle;

the third identification module is used for identifying whether the current extension length collected by a length sensor is within the predetermined range of boom extension length in case that the second identification module identifies that the current rotating angle collected by a rotating angle encoder is within the predetermined range of boom rotating angle;

the execution module is used for modifying the amplitude so as to adjust the current boom pitch angle to one angle within the predetermined range of boom pitch angle in case that the first identification module identifies that the current boom pitch angle is not within the predetermined rang of boom pitch angle; rotating the boom so as to adjust the current rotating angle to one angle within the range of boom rotating angle in case that the second identification module identifies that the current rotating angle is not within the predetermined range of boom rotating angle; and extending the boom frame so as to adjust the current extension length to one length within the predetermined range of boom extension length in case that the third identification module identifies that the current extension length is not within the predetermined range of boom extension length and hoisting the object in case that the third identification module identifies that the current extension length is within the predetermined range of boom extension length.

In one example of the present disclosure, the reference station is further used for transmitting the known precise coordinate of the reference station to the first mobile station and the second mobile station; the first mobile station is further used for acquiring a precise coordinate of the first mobile station based on the known precise coordinate of the reference station and the relative coordinate information of the first mobile station and transmitting the precise coordinate of the first mobile station to the crane resolving unit; the second mobile station is further used for acquiring a precise coordinate of second mobile station based on the known precise coordinate of the reference station and the relative coordinate information of the second mobile station and transmitting the precise coordinate of second mobile station to the crane resolving unit.

According to the present disclosure, the positioning precision of the work object can be greatly increased by a real-time differentiation measurement method; meanwhile, by automatic tracking of the boom, the hoisting height, the boom pitch angle and the boom extension length can be automatically adjusted to be within predetermined ranges during the hoisting process, thereby avoiding errors and risks aroused from adjustments based on visual measurements.

BRIEF DESCRIPTION ON THE DRAWINGS

In order to more clearly illustrate the embodiments of the present disclosure or the technical solutions in the prior art, a brief introduction will be given below for the drawings required to be used in the description of the embodiments or the prior art. It is obvious that, the drawings illustrated as follows are merely some of the embodiments of the present disclosure. For an ordinary technician in the art, he or she may also acquire other drawings according to such drawings on the premise that no inventive effort is involved.

DETAILED DESCRIPTION OF THE INVENTION

Figure 1:
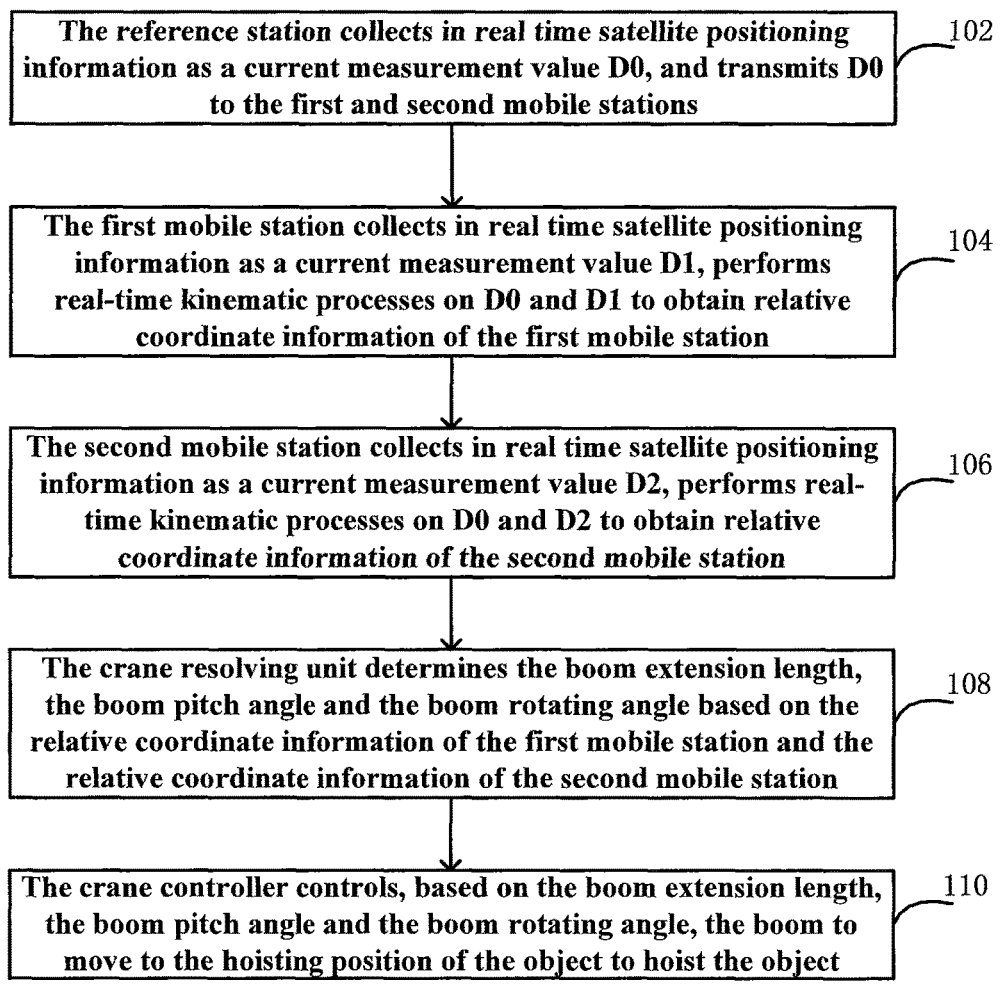
FIG. 1 is a schematic diagram of one example of the method for positioning an engineering machinery work object according to the present disclosure.

The technical solutions in the embodiments of the present disclosure will be clearly and completely described below with the drawings of the embodiments of the present disclosure. Obviously, the described embodiments are just a part of the embodiments of the present disclosure instead of all of them. The following descriptions on at least one illustrative embodiment are actually illustrative, but shall not be any limitation on the present disclosure or its application or use. All other embodiments that are obtainable to those skilled in the art based on the embodiments of the present disclosure without any creative effort are included in the protection scope of the present disclosure.

Unless otherwise illustrated, respective arrangements, mathematic expressions and values of the components and steps illustrated in these embodiments do not limit the scope of the present disclosure.

Meanwhile, it shall be understood that in order to facilitate description, the respective parts shown in the drawings are not drawn in sizes according to actual proportional relations.

Techniques, methods and devices that have already been known to ordinary technicians in the art may not be discussed here in detail, but under suitable circumstances, the techniques, methods and devices shall be deemed as parts of the granted description.

In the embodiments shown and discussed here, any specific value shall be interpreted as only illustrative, instead of limitative. Hence, other embodiments of the illustrative embodiments may have different values.

It shall be noted that similar marks and letters represent similar items in the following figures, so once a certain item is defined in one figure, no further discussion on it is required in the following figures.

Figure 2:
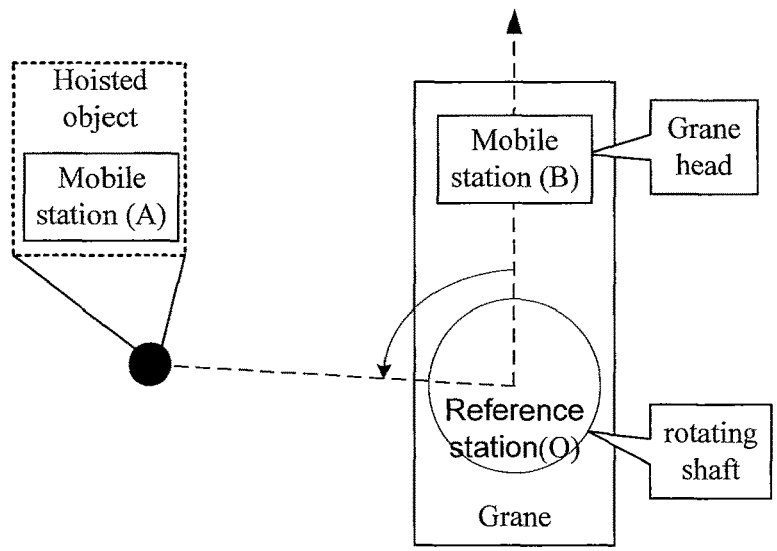
FIG. 2 is a schematic diagram showing the installment of the reference station and the mobile stations in one example according to the present disclosure.

FIG. 1 is a schematic diagram of one example of the method for positioning an engineering machinery work object. Preferably, the example is performed by an engineering machinery work object positioning system according to the present disclosure. As shown in FIG. 1, the method comprises the following steps:

Step 102, the reference station collects in real time satellite positioning information as a reference station current measurement value D0, and transmits the reference station current measurement value D0 to the first mobile station and the second mobile station. As shown in FIG. 2, the reference station is disposed at the rotating shaft center of a crane, the first mobile station is disposed at the hoisting position of an object to be hoisted, and the second mobile station is disposed at the vehicle head of the crane.

The reference station as used herein refers to an instrument used as a fixed station, which is supported by a foot rest and immobile with respect to another instrument mobile station. In operation, a satellite positioning system receiver needs to be placed on the reference station for the observation. The reference station transmits in real time the measurement station precise coordinate and received satellite information directly or after processing to the mobile station receiver (the point to be determined). The mobile station is relative to the reference station. The mobile station receiver receives information from the reference station while conducting GPS observation, and modifies the results to increase the positioning precision.

Preferably, said satellite positioning data may be satellite positioning data from a satellite navigation system selected from Beidou (Compass) Satellite Navigation System of China, GPS of the USA, GLONASS (Global Satellite Navigation System) of Russia, Galileo Satellite Positioning System of Europe and the like.

Step 104, the first mobile station collects in real time satellite positioning information as a first mobile station current measurement value D1, performs real-time kinematic processes on the reference station current measurement value D0 and the first mobile station current measurement value D1 to obtain relative coordinate information of the first mobile station, and transmits the relative coordinate information R1 of the first mobile station to a crane resolving unit.

In one example of the present disclosure, a Real-time Kinematic (RTK) GPS measurement method is employed in the present disclosure to determine the precise relative position of the object (mobile station) with respect to the reference station. Wherein the RTK is a measurement method that can obtain in real time millimeter-scaled positioning precision in the wild. The RTK positioning technique is a real-time kinematic positioning technique based on carrier phase observation values, which can provide three-dimensional positioning results for the measurement station in a designated coordinate in real time and reach a millimeter-scaled precision (associated with the number of GPS satellites, atmospheric ionized layer and GPS antenna gains).

In an RTK operation mode, the reference station transmits the observation value (GPS collected value) and measurement station coordinate information together to the mobile station through a data link. The mobile station not only receives data from the reference station through the data link but also collects GPS observation data, and constitutes kinematic observation values within the system for real-time processing, and at the same time produces a positioning result within a period of no more than 1 second. The mobile station may be in a static state or in a motion state; it may be initialized at a fixed site and then enter the kinematic job, or may be started up directly under a kinematic condition and complete searching and resolution of the integer ambiguity under the kinematic environment. After the resolution of the integer unknown number is fixed, real-time processing for each epoch can be carried out. As long as tracking of phase observation values and essential geometric patterns of four or more satellites can be maintained, the mobile station can yield a millimeter-scaled positioning result at any time.

In one example of the present disclosure, the GPS receiver is a dual-frequency receiver that can receive two channels of carrier signals at the same time. The influence of the ionized layer on the delay of the electromagnetic signal can be eliminated using the difference in delay of the two frequencies for the ionized layer.

In one example of the present disclosure, the first mobile station transmits the relative coordinate information R1 of the first mobile station to the crane resolving unit via wireless data transmission. The "wireless data transmission" uses a wireless network as the communication platform, which provides a standard RS-232/485/TTL interface, designed according to industrial standards, and can be directly connected with various slave devices at industrial sites including RTU, PLC, smart instruments, singlechip controller and so on. A bidirectional data conversion transmission device can immediately convert serial communications over an industrially applied RS232/RS485 serial device to GPRS wireless network communications.

Step 106, the second mobile station collects in real time satellite positioning information as a second mobile station current measurement value D2, performs real-time kinematic processes on the reference station current measurement value D0 and the second mobile station current measurement value D2 to obtain relative coordinate information of the second mobile station, and transmits the relative coordinate information of the second mobile station to the crane resolving unit.

In one example of the present disclosure, the second mobile station transmits the relative coordinate information R2 of the second mobile station to the crane resolving unit via a CAN bus.

Step 108, the crane resolving unit determines the boom extension length, the boom pitch angle and the boom rotating angle based on the relative coordinate information R1 of the first mobile station and the relative coordinate information R2 of the second mobile station.

In one example of the present disclosure, the resolving unit may use an embedded processor to move the real-time operating system. The crane resolving unit integrates the CAN bus controller, the UART serial unit, the SPI interface and so on and can be directly connected to the reference station.

Step 110, the crane controller controls, based on the boom extension length, the boom pitch angle and the boom rotating angle, the boom to move to the hoisting position of the object to hoist the object.

Based on the method for positioning an engineering machinery work object provided in the above examples of the present disclosure, by means of an RTK (Real-time kinematic) measurement method, relative positions of observation sites are determined according to observation data from two or more receivers, i.e., a reference station is mounted on the crane, the observation value being a reference station current measurement value D0 is transmitted to the receiver on the object, the object receiver collects position information being a first mobile station current measurement value D1 and performs differential calculation on D0 and D1 to accurately obtain the distance between the crane and the object, thereby greatly increasing the precision of positioning the work object, with a precision of 1 to 2 cm.

Figure 3:
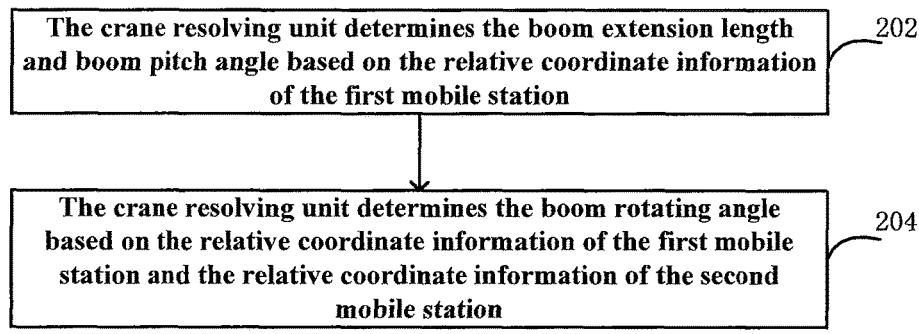
FIG. 3 is a schematic diagram showing the crane resolving unit determining the boom extension length, the boom pitch angle and the boom rotating angle in one example according to the present disclosure.

In one example of the present disclosure, as shown in FIG. 3, Step 108 may include:

Step 302, the crane resolving unit determines the boom extension length and the boom pitch angle based on the relative coordinate information R1 of the first mobile station.

Preferably, as shown in FIG. 2, after acquiring relative coordinate of the first mobile station (station A) and the current boom orientation angle of the crane, the crane resolving unit calculates suitable boom extension length and pitch angle according to restrictive conditions input by the user (e.g., a range of hoisting height, a range of boom pitch height).

Step 304, the crane resolving unit determines the boom rotating angle based on the relative coordinate information R1 of the first mobile station and the relative coordinate information R2 of the second mobile station.

Preferably, as shown in FIG. 2, the crane resolving unit may determine the rotating angle of the crane based on the relative position coordinate between the first mobile station and the second mobile station (stations A and B).

In the above example of the present disclosure, the reference station is fixed at the circle center of the crane rotating shaft to avoid a motion plan error (boom extension length, pitch angle) caused by a great error in the measurement of the vehicle body direction. Meanwhile, a second mobile station (station B) is mounted at the vehicle head of the crane to assist the positioning of the vehicle head angle to determine the rotating angle. Hence, in case of a great error in the measurement of the vehicle body direction, in practical operation, it is only necessary to adjust the rotating angle.

In one example of the present disclosure, following step 108 as shown in FIG. 1, the method may further comprise:

determining whether the boom extension length, the boom pitch angle and the boom rotating angle are within the respective predetermined ranges of hoisting height, boom pitch angle and boom rotating angle;

if it is determined that the boom extension length, the boom pitch angle and the boom rotating angle are not within the respective predetermined ranges of hoisting height, boom pitch angle and boom rotating angle, outputting alarm information;

if it is determined that the boom extension length, the boom pitch angle and the boom rotating angle are within the respective predetermined ranges of hoisting height, boom pitch angle and boom rotating angle, transmitting said boom extension length, boom pitch angle and boom rotating angle to the crane controller via the CAN bus and performing step 110 as shown in FIG. 1.

In said example of the present disclosure, if the value acquired by the resolving unit is beyond the restrictive conditions as set or the crane itself cannot move to the hoisting position of station A, the resolving unit will output alarm information. In this way, a malfunction of the crane can be avoided, and the operator may be reminded that the crane itself cannot move to the hoisting position of station A.

Figure 4:
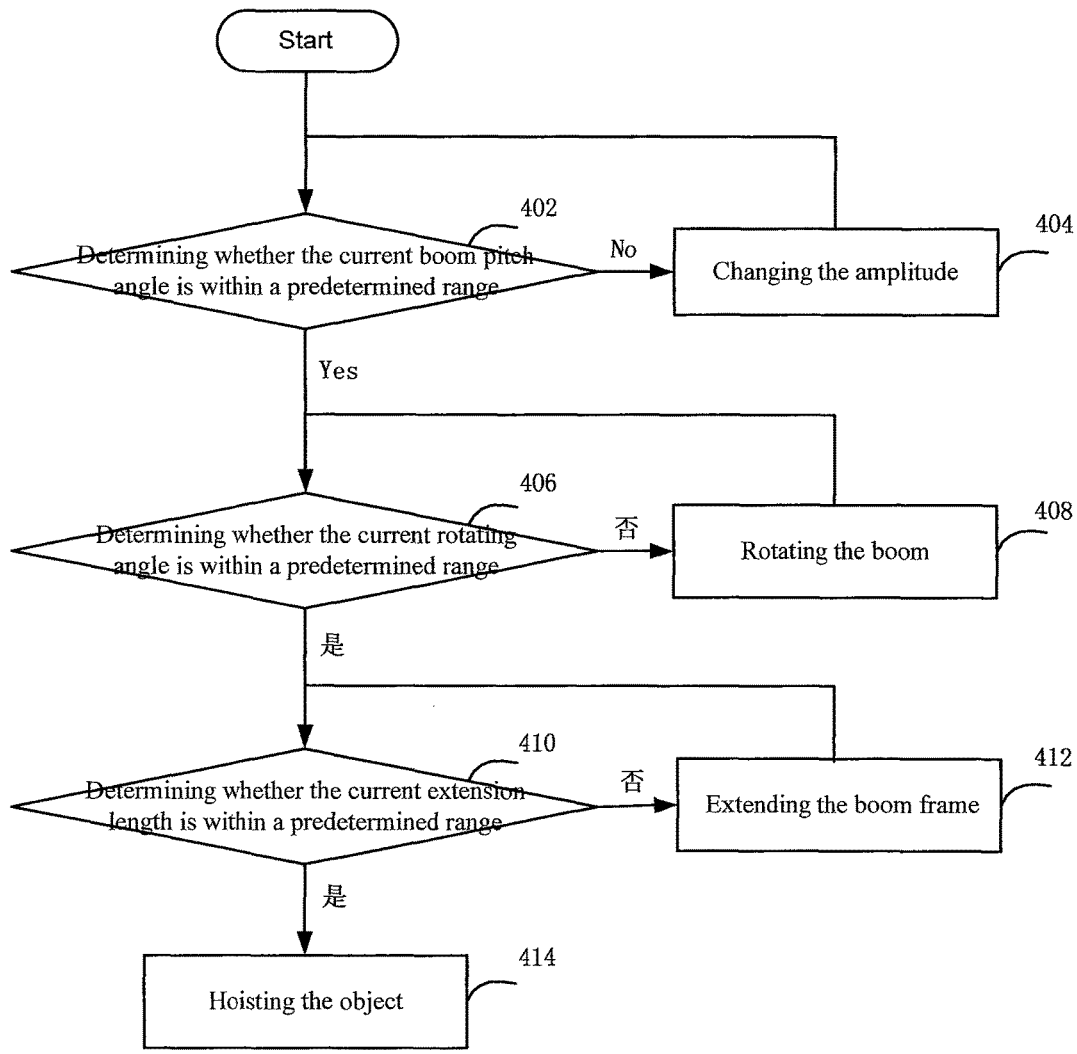
FIG. 4 is a schematic diagram showing the crane controller controlling the boom to move to the hoisting position of the object to hoist the object in one example according to the present disclosure.

In one example of the present disclosure, as shown in FIG. 4, step 110 in the example as shown in FIG. 1 may include:

Step 402, during the process of controlling the boom to move to the hoisting position of the object, determining whether the current boom pitch angle collected by the main arm angle sensor is within a predetermined range of boom pitch angle; if the current boom pitch angle is not within the predetermined range of boom pitch angle, performing step 404; otherwise, if the current boom pitch angle is within the predetermined range of boom pitch angle, performing step 406.

Preferably, the predetermined range of boom pitch angle refers to a range of difference for the boom pitch angle as set by the user, wherein the boom pitch angle is determined by the crane resolving unit.

Step 404, after modifying the amplitude, repeatedly performing step 402 so as to adjust the current boom pitch angle to one within the predetermined range of boom pitch angle.

Step 406, determining whether the current rotating angle collected by a rotating angle encoder is within a predetermined range of boom rotating angle. If the current boom rotating angle is not within the predetermined range of boom rotating angle, performing step 408; otherwise, if the current boom rotating angle is within the predetermined range of boom rotating angle, performing step 410.

Preferably, the predetermined range of boom rotating angle refers to a range of difference for the boom rotating angle as set by the user, wherein the boom rotating angle is determined by the crane resolving unit.

Step 408, rotating the boom, and then repeatedly performing step 406 so as to adjust the current boom rotating angle to one within the predetermined range of boom rotating angle.

Step 410, determining whether the current extension length collected by a length sensor is within a predetermined range of boom extension length. If the current boom extension length is not within the predetermined range of boom extension length, performing step 412; otherwise, if the current boom extension length is within the predetermined range of boom extension length, performing step 414.

Preferably, the predetermined range of boom extension length refers to a range of difference for the boom extension length as set by the user, wherein the boom extension length is determined by the crane resolving unit.

Step 412, extending the boom, and then repeatedly performing step 410 so as to adjust the current extension length to one within the predetermined range of boom extension length.

Step 414, controlling the boom to move to the hoisting position of the object to hoist the object.

In the above example of the present disclosure, a crane resolving unit is used to conduct a computation based on the position information collected by the receiver, and at the same time, the crane controller determines the hoisting height, the boom pitch height and the boom extension length within the range of difference as set by the user to complete the hoisting process.

In one example of the present disclosure, in step 102 as shown in FIG. 1, the method may further comprise: the reference station transmits known precise coordinate d0 of the reference station to the first mobile station and the second mobile station.

In step 104 as shown in FIG. 1, the method may further comprise: the first mobile station acquires the first mobile station precise coordinate d1 based on the precise coordinate d0 of the reference station and the relative coordinate information R1 of the first mobile station, and transmits it to the crane resolving unit to display the precise coordinate d1 of the first mobile station.

In step 106 as shown in FIG. 1, the method may further comprise: the second mobile station acquires the precise coordinate d2 of second mobile station based on the precise coordinate d0 of the reference station and the relative coordinate information R2 of the second mobile station, and transmits it to the crane resolving unit to display the precise coordinate d2 of the second mobile station.

Based on the above example of the present disclosure, the precise coordinate d1 of the first mobile station and the precise coordinate d2 of the second mobile station can be determined and displayed.

Figure 5:
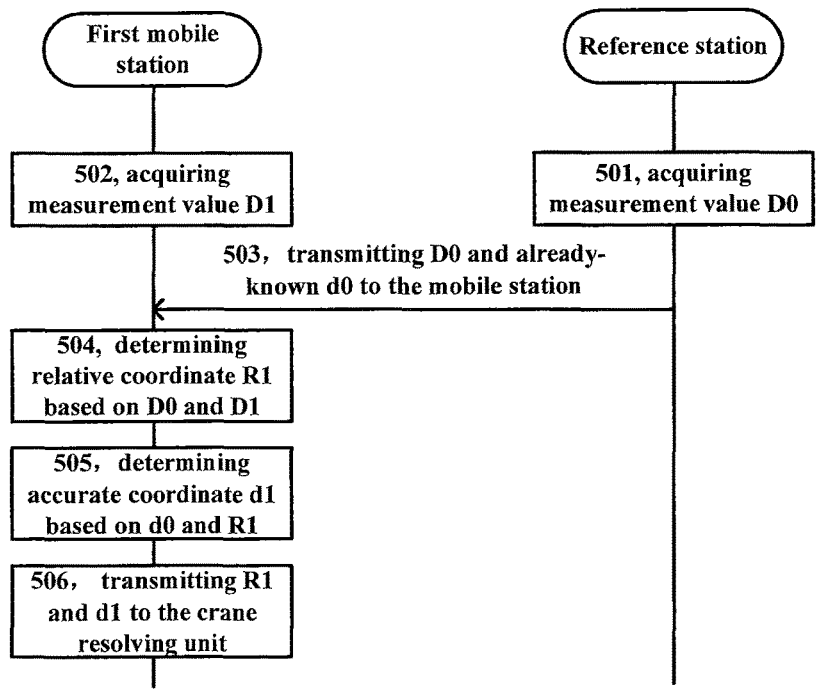
FIG. 5 is a schematic diagram showing the reference station and the first mobile station determining coordinates of the first mobile station in one example according to the present disclosure.

FIG. 5 is a schematic diagram showing the determination of the first mobile station coordinate by the reference station and the mobile stations in one example according to the present disclosure. As shown in FIG. 5, the method comprises:

Step 501, the reference station collects in real time satellite positioning information as a reference station current measurement value D0.

Step 502, the first mobile station collects in real time satellite positioning information as a first mobile station current measurement value D1.

Preferably, the sequence of step 501 and step 502 can be exchanged.

Step 503, the reference station transmits D0 and a known precise coordinate d0 of the reference station to the first mobile station.

Step 504, the first mobile station performs real-time kinematic processes on D0 and D1 to obtain relative coordinate information R1 of the first mobile station.

Step 505, the first mobile station determines the precise coordinate d1 of the first mobile station based on d0 and R1.

Step 506, the first mobile station transmits R1 and d1 to the crane resolving unit. In the above example of the present disclosure, the procedure in which the reference station and the second mobile station determine the second mobile station coordinate is similar to the procedure as shown in FIG. 5, which would not be repeated here.

In the above example of the present disclosure, after the first mobile station transmits R1 and d1 to the crane resolving unit, and the second mobile station transmits R2 and d2 to the crane resolving unit, step 108 and step 110 in the example as shown in FIG. 1 are performed.

In the examples as shown in FIGS. 1-5, the reference station collects the measurement value D0 and transmits it to the mobile stations, the mobile stations perform real-time kinematic computations to obtain relative coordinates of the mobile stations and determine precise coordinates of the mobile stations, thereby reducing the requirement on the performance of the reference station.

Figure 6:
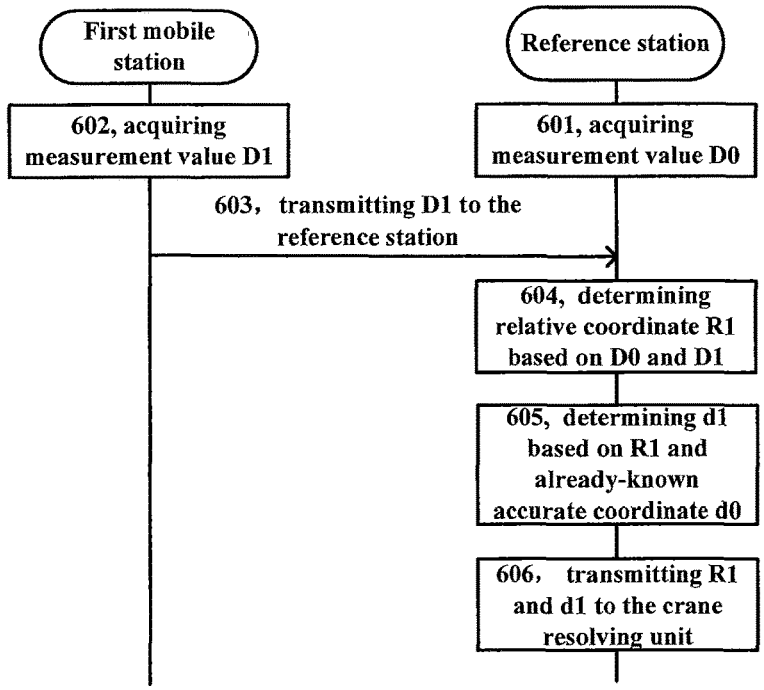
FIG. 6 is a schematic diagram of another example of the method for positioning an engineering machinery work object according to the present disclosure.

FIG. 6 is a schematic diagram of another example of the method for positioning an engineering machinery work object. The method comprises:

Step 601, the reference station collects in real time satellite positioning information as a reference station current measurement value D0.

Step 602, the first mobile station collects in real time satellite positioning information as a first mobile station current measurement value D1.

Preferably, the sequence of step 601 and step 602 can be exchanged.

Step 603, the first mobile station transmits D1 to the reference station.

Step 604, the reference station performs real-time kinematic processes on D0 and D1 to obtain relative coordinate information R1 of the first mobile station.

Step 605, the reference station determines the precise coordinate d1 of the first mobile station based on R1 and a known precise coordinate d0 of the reference station.

Step 606, the reference station transmits R1 and d1 to the crane resolving unit.

In the above example of the present disclosure, the procedure in which the reference station and the second mobile station determine the second mobile station coordinate is similar to the procedure as shown in FIG. 6, which would not be repeated here.

In the above example of the present disclosure, after the first mobile station transmits R1 and d1 to the crane resolving unit, and the second mobile station transmits R2 and d2 to the crane resolving unit, step 108 and step 110 in the example as shown in FIG. 1 are performed.

The example as shown in FIG. 6 differs from the example as shown in FIG. 5 mainly in that: the steps of performing real-time kinematic computation to obtain the relative coordinate of the mobile station and determining the precise coordinate of the mobile station are performed by the reference station, thereby reducing the requirement on the performance of the mobile station. Meanwhile, signal communication is carried out between the first mobile station and the crane only once, i.e., step 603, thereby increasing the efficiency of the system.

Figure 7:
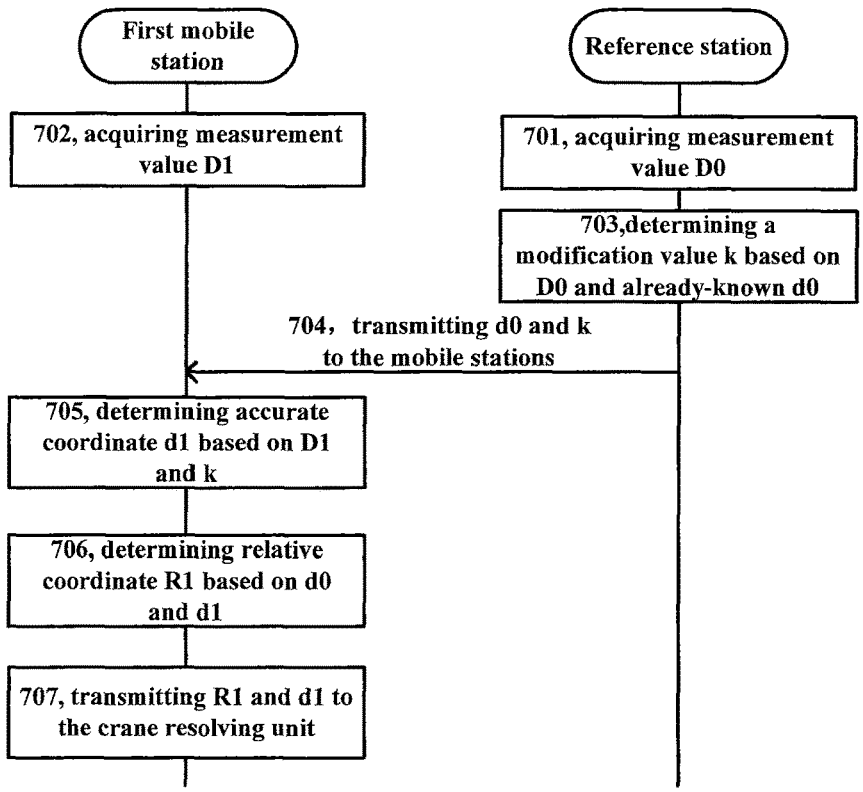
FIG. 7 is a schematic diagram of a further example of the method for positioning an engineering machinery work object according to the present disclosure.

FIG. 7 is a schematic diagram of a further example of the method for positioning an engineering machinery work object. The method comprises:

Step 701, the reference station collects in real time satellite positioning information as a reference station current measurement value D0.

Step 702, the first mobile station collects in real time satellite positioning information as a first mobile station current measurement value D1.

Step 703, the reference station determines a modification value k based on D0 and a known precise coordinate d0 of the reference station.

Preferably, step 702 may be performed before step 701, or after step 703.

Step 704, the reference station transmits d0 and k to the first mobile station.

Step 705, the first mobile station determines the precise coordinate d1 of the first mobile station based on D1 and k.

Step 706, the first mobile station determines the precise coordinate information R1 of the first mobile station based on d0 and d1.

Step 707, the first mobile station transmits R1 and d1 to the crane resolving unit.

In the above example of the present disclosure, the procedure in which the reference station and the second mobile station determine the second mobile station coordinate is similar to the procedure as shown in FIG. 7, which would not be repeated here.

In the above example of the present disclosure, after the first mobile station transmits R1 and d1 to the crane resolving unit, and the second mobile station transmits R2 and d2 to the crane resolving unit, step 108 and step 110 in the example as shown in FIG. 1 are performed.

The example as shown in FIG. 7 is similar to the example as shown in FIG. 5, mainly differing in that: the reference station determines a modification value based on the reference station measurement value and known reference station precise coordinate, and transmits the modification value to the mobile station, and the mobile station determines the precise coordinate of the mobile station based on the modification value and the mobile station measurement value.

Figure 8:
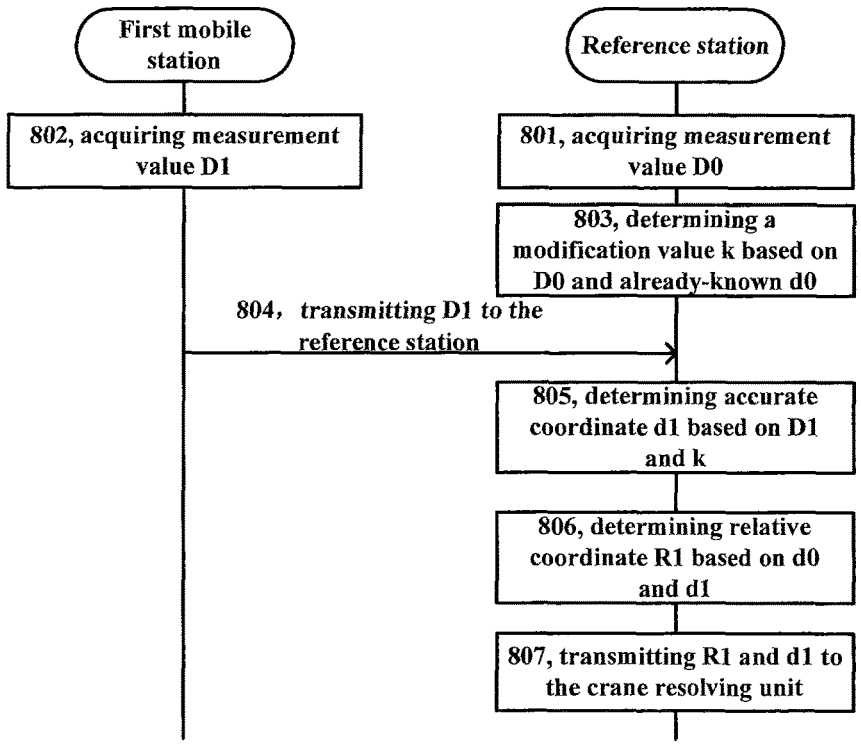
FIG. 8 is a schematic diagram of a still further example of the method for positioning an engineering machinery work object according to the present disclosure.

FIG. 8 is a schematic diagram of a still further example of the method for positioning an engineering machinery work object. The method comprises:

Step 801, the reference station collects in real time satellite positioning information as a reference station current measurement value D0.

Step 802, the first mobile station collects in real time satellite positioning information as a first mobile station current measurement value D1.

Step 803, the reference station determines a modification value k based on D0 and a known precise coordinate d0 of the reference station.

Preferably, step 802 may be performed before step 801, or after step 803.

Step 804, the first mobile station transmits D1 to the reference station.

Step 805, the reference station determines the precise coordinate d1 of the first mobile station based on D1 and k.

Step 806, the reference station determines the precise coordinate information R1 of the first mobile station based on d0 and d1.

Step 807, the reference station transmits R1 and d1 to the crane resolving unit.

In the above example of the present disclosure, the procedure in which the reference station and the second mobile station determine the second mobile station coordinate is similar to the procedure as shown in FIG. 8, which would not be repeated here.

In the above example of the present disclosure, after the first mobile station transmits R1 and d1 to the crane resolving unit, and the second mobile station transmits R2 and d2 to the crane resolving unit, step 108 and step 110 in the example as shown in FIG. 1 are performed.

The example as shown in FIG. 8 is similar to the example as shown in FIG. 7, differing mainly in that: the steps of performing real-time kinematic computation to obtain the relative coordinate of the mobile station and determining the precise coordinate of the mobile station are performed by the reference station, thereby reducing the requirement on the performance of the mobile station. Meanwhile, signal communication is carried out between the first mobile station and the crane only once, i.e., step 804, thereby increasing the efficiency of the system.

Figure 9:
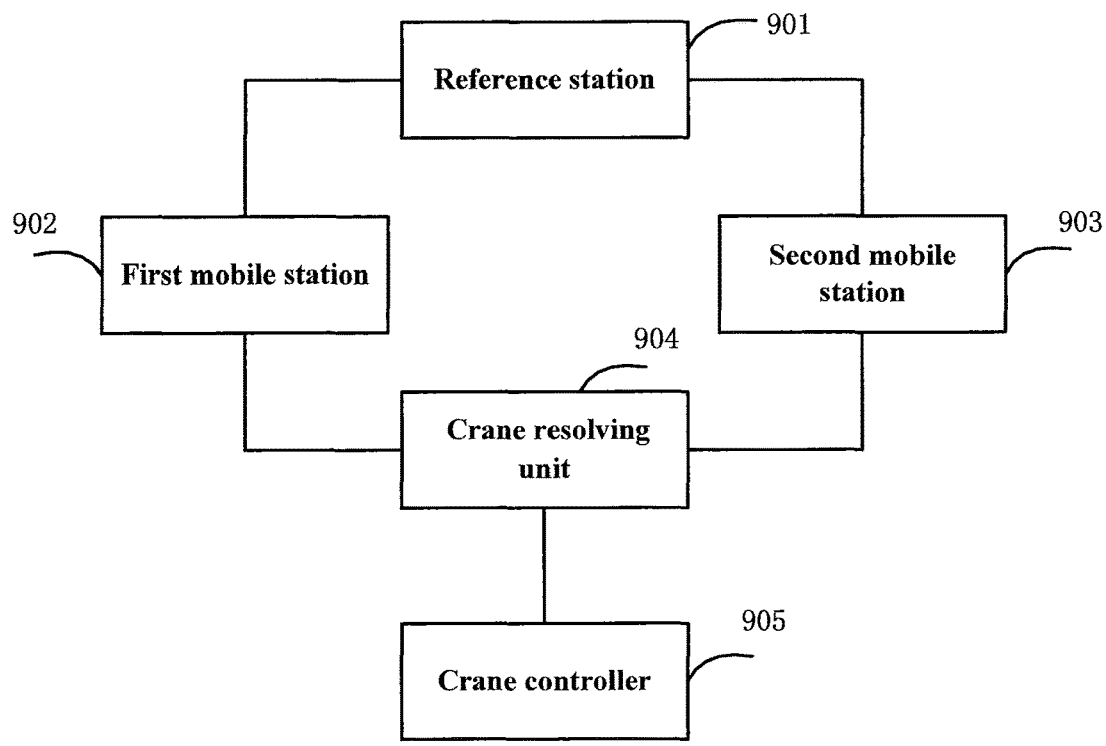
FIG. 9 is a schematic diagram of one example of the system for positioning an engineering machinery work object according to the present disclosure.

FIG. 9 is a schematic diagram of one example of the system for positioning an engineering machinery work object. As shown in FIG. 9, the engineering machinery work object positioning system as illustrated comprises a reference station 901, a first mobile station 902, a second mobile station 903, a crane resolving unit 904 and a crane controller 905, wherein the reference station 901 is disposed at the center of the crane rotating shaft, the first mobile station 902 is disposed at the hoisting position of the object, and the second mobile station 903 is disposed at the vehicle head of the crane, wherein:

the reference station 901 is used for collecting in real time satellite positioning information as a reference station current measurement value D0, and transmitting D0 to the first mobile station 902 and second mobile station 903;

the first mobile station 902 is used for collecting in real time satellite positioning information as a first mobile station current measurement value D1, performing real-time kinematic processes on D0 and D1 to obtain relative coordinate information R1 of the first mobile station 902, and transmitting the relative coordinate information R1 of the first mobile station 902 to the crane resolving unit 904;

the second mobile station 903 is used for collecting in real time satellite positioning information as a second mobile station current measurement value D2, performing real-time kinematic processes on D0 and D2 to obtain relative coordinate information R2 of the second mobile station 903, and transmitting the relative coordinate information R2 of the second mobile station 903 to the crane resolving unit 904;

the crane resolving unit 904 is used for determining the boom extension length, the boom pitch angle and the boom rotating angle based on the relative coordinate information R1 of the first mobile station 902 and the relative coordinate information R2 of the second mobile station 903;

the crane controller 905 is used for controlling based on the boom extension length, the boom pitch angle and the boom rotating angle, the boom to move to the hoisting position of the object to hoist the object.

Based on the method for positioning an engineering machinery work object provided in the above examples of the present disclosure, by means of an RTK measurement method, relative positions of observation sites are determined according to observation data from two or more receivers, i.e., a reference station is mounted on the crane, the observation value D0 is transmitted to the receiver on the object, the object receiver collects position information D1 and performs differential calculation on D0 and D1 to accurately obtain the distance between the crane and the object, thereby greatly increasing the precision of positioning the work object, with a precision of 1 to 2 cm.

In one example of the present disclosure, the crane resolving unit 904 is further used for, after determining the boom extension length, the boom pitch angle and the boom rotating angle based on the relative coordinate information R1 of the first mobile station 902 and the relative coordinate information R2 of the second mobile station 903, determining whether the boom extension length, the boom pitch angle and the boom rotating angle are within predetermined ranges of hoisting height, boom pitch angle and boom rotating angle, if the boom extension length, the boom pitch angle and the boom rotating angle are not within the predetermined ranges of hoisting height, boom pitch angle and boom rotating angle, outputting alarm information, and if the boom extension length, the boom pitch angle and the boom rotating angle are within the predetermined ranges of hoisting height, boom pitch angle and boom rotating angle, instructing the crane controller 905 to execute the operation of controlling the boom to move to the hoisting position of the object and hoist the object based on the boom extension length, the boom pitch angle and the boom rotating angle.

In said example of the present disclosure, if the value acquired by the resolving unit is beyond the restrictive conditions as set or the crane itself cannot move to the hoisting position of station A, the resolving unit will output alarm information. In this way, a malfunction of the crane can be avoided, and the operator may be reminded that the crane itself cannot move to the hoisting position of station A.

Figure 10:
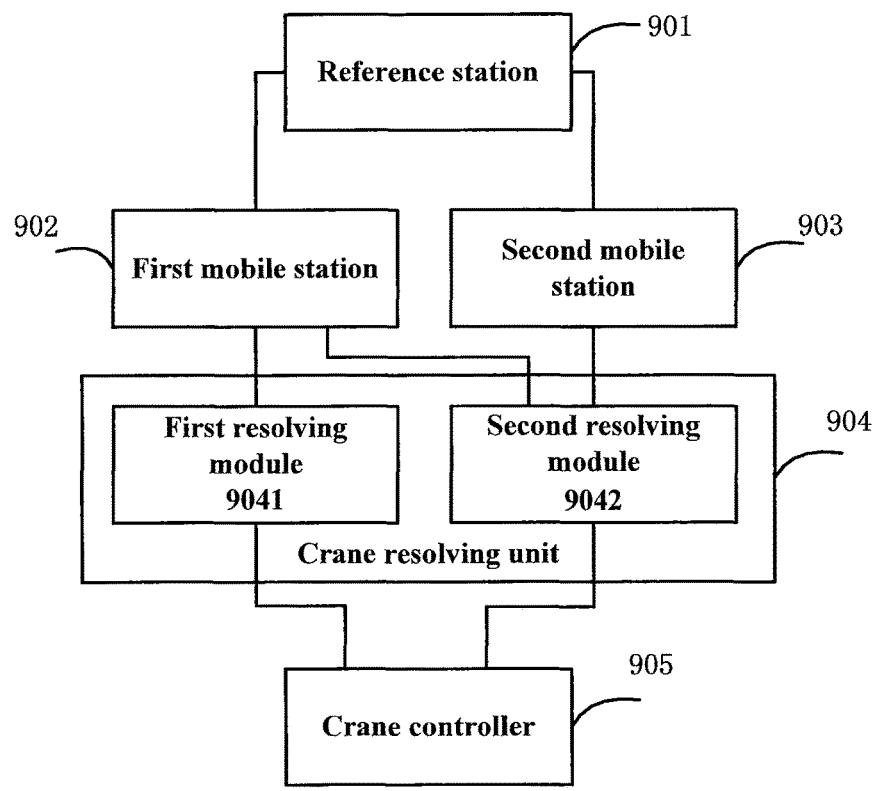
FIG. 10 is a schematic diagram of another example of the system for positioning an engineering machinery work object according to the present disclosure.

In one example of the present disclosure, as shown in FIG. 10, the crane resolving unit 904 may comprise a first resolving module 9041 and a second resolving module 9042, wherein:

the first resolving module 9041 is used for determining the boom extension length and the boom pitch angle based on the relative coordinate information R1 of the first mobile station 902;

the second resolving module 9042 is used for determining the boom rotating angle based on the relative coordinate information R1 of the first mobile station 902 and the relative coordinate information R2 of the second mobile station 903.

In the above example of the present disclosure, the reference station is fixed at the circle center of the crane rotating shaft to avoid a motion plan error (boom extension length, pitch angle) caused by a great error in the measurement of the vehicle body direction. Meanwhile, a second mobile station (station B) is mounted at the vehicle head of the crane to assist the positioning of the vehicle head angle to determine the rotating angle. Hence, in case of a great error in the measurement of the vehicle body direction, in practical operation, it is only necessary to adjust the rotating angle.

Figure 11:
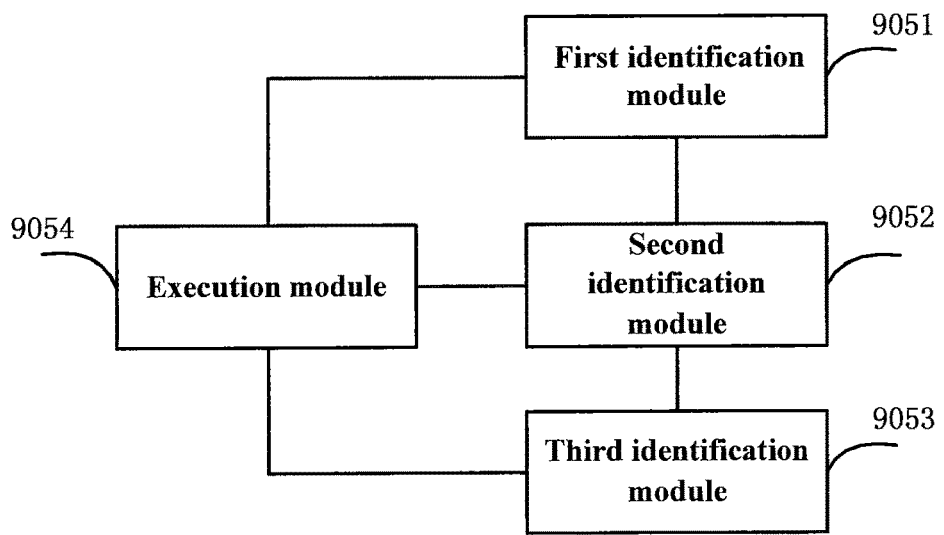
FIG. 11 is a schematic diagram showing the crane controller in one example according to the present disclosure.

In one example of the present disclosure, as shown in FIG. 11, the crane controller 905 may comprise a first identification module 9051, a second identification module 9052, a third identification module 9053 and an execution module 9054, wherein:

the first identification module 9051 is used for identifying whether the current boom pitch angle collected by a main arm angle sensor is within the predetermined range of boom pitch angle;

the second identification module 9052 is used for identifying whether the current rotating angle collected by a rotating angle encoder is within the predetermined range of boom rotating angle in case that the first identification module 9051 identifies that the current boom pitch angle is within the predetermined range of boom pitch angle;

the third identification module 9053 is used for identifying whether the current extension length collected by a length sensor is within the predetermined range of boom extension length in case that the second identification module 9052 identifies that the current rotating angle collected by a rotating angle encoder is within the predetermined range of boom rotating angle;

the execution module 9054 is used for modifying the amplitude so as to adjust the current boom pitch angle to one angle within the predetermined range of boom pitch angle in case that the first identification module 9051 identifies that the current boom pitch angle is not within the predetermined rang of boom pitch angle; rotating the boom so as to adjust the current rotating angle to one angle within the range of boom rotating angle in case that the second identification module 9052 identifies that the current rotating angle is not within the predetermined range of boom rotating angle; and extending the boom frame so as to adjust the current extension length to one length within the predetermined range of boom extension length in case that the third identification module 9053 identifies that the current extension length is not within the predetermined range of boom extension length and hoisting the object in case that the third identification module 9053 identifies that the current extension length is within the predetermined range of boom extension length.

In the above example of the present disclosure, a crane resolving unit is used to conduct a computation based on the position information collected by the receiver, and at the same time, the crane controller determines the hoisting height, the boom pitch height and the boom extension length within the range of difference as set by the user to complete the hoisting process.

In one example of the present disclosure, the reference station 901 is further used for transmitting a known precise coordinate d0 of the reference station to the first mobile station 902 and the second mobile station 903;

the first mobile station 902 is further used for acquiring a precise coordinate d1 of the first mobile station 902 based on the precise coordinate d0 of the reference station 901 and the relative coordinate information R1 of the first mobile station 902, and transmitting the precise coordinate d1 of the first mobile station 902 to the crane resolving unit 904 for displaying the precise coordinate d1 of the first mobile station 902.

the second mobile station 903 is further used for acquiring a precise coordinate d2 of the second mobile station 903 based on the precise coordinate d0 of the reference station 901 and the relative coordinate information R2 of the second mobile station 903, and transmitting the precise coordinate d2 of the second mobile station 903 to the crane resolving unit 904 for displaying the precise coordinate d2 of the second mobile station 903.

Based on the above example of the present disclosure, the precise coordinate d1 of the first mobile station and the precise coordinate d2 of the second mobile station can be determined and displayed.

In one example of the present disclosure, corresponding to the example as shown in FIG. 7, the reference station 901 can be used for collecting in real time satellite positioning information as a reference station current measurement value D0, determining a modification value k based on D0 and a known precise coordinate d0 of the reference station 901, and transmitting d0 and k to the first mobile station 902 and second mobile station 903;

the first mobile station 902 can be used for collecting in real time satellite positioning information as a first mobile station current measurement value D1, determining precise coordinate d1 of the first mobile station 901 based on D1 and k, determining the relative coordinate information R1 of the first mobile station 901 based on d0 and d1, and transmitting the relative coordinate information R1 and the precise coordinate d1 of the first mobile station 902 to the crane resolving unit 904;

the second mobile station 903 can be used for collecting in real time satellite carrier phase measurement value D2, determining precise coordinate d2 of the second mobile station 903 based on D2 and k, determining the relative coordinate information R2 of the second mobile station based on d0 and d2, and transmitting the relative coordinate information R2 and the precise coordinate d2 of the second mobile station 903 to the crane resolving unit 904.

The above example of the present disclosure differs from the example as shown in FIG. 9 in that: in the present example, the reference station determines a modification value based on the reference station measurement value and known reference station precise coordinate, and transmits the modification value to the mobile station, and the mobile station determines the precise coordinate of the mobile station based on the modification value and the mobile station measurement value.

Figure 12:
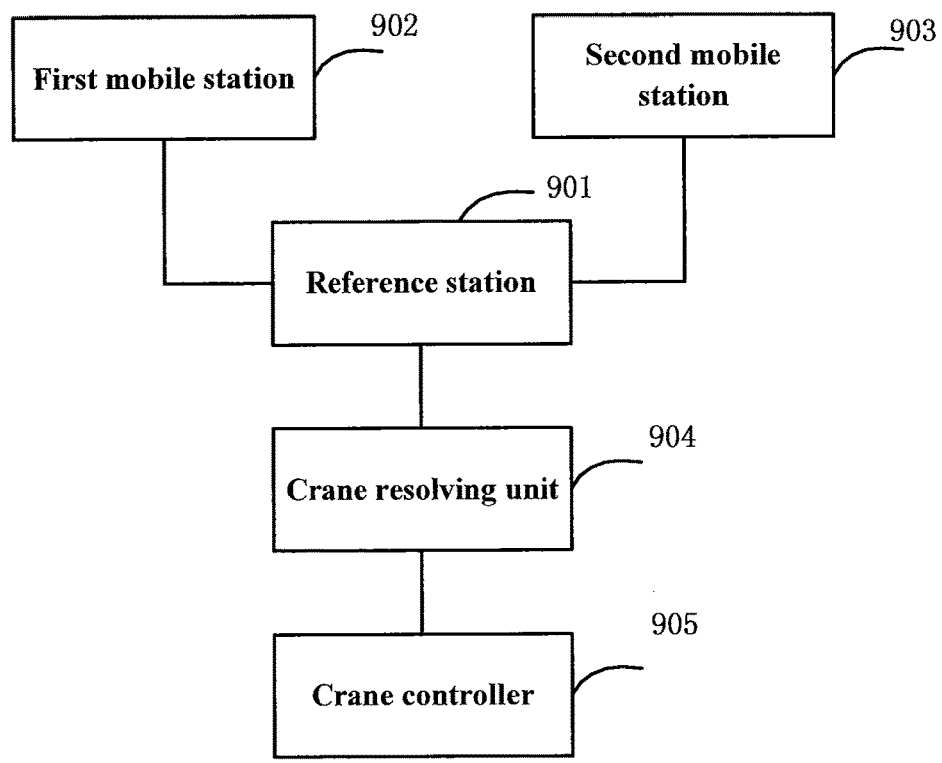
FIG. 12 is a schematic diagram of a further example of the system for positioning an engineering machinery work object according to the present disclosure.

FIG. 12 is a schematic diagram of a further example of the system for positioning an engineering machinery work object according to the present disclosure. Differing from the example as shown in FIG. 9, the reference station 901 is connected to the crane resolving unit 904, while the first mobile station 902 and the second mobile station 903 are not connected to the crane resolving unit 904, wherein:

the first mobile station 902 is used for collecting in real time satellite positioning information as a first mobile station current measurement value D1 and transmitting D1 to the reference station;

the first mobile station 903 is used for collecting in real time satellite positioning information as a second mobile station current measurement value D2 and transmitting D2 to the reference station;

the reference station 901 is used for collecting in real time satellite positioning information as a current measurement value D0; performing real-time kinematic processes on D0 and D1 to obtain relative coordinate information R1 of the first mobile station, determining a precise coordinate d1 of the first mobile station based on R1 and the known precise coordinate d0 of the reference station; performing real-time kinematic processes on D0 and D2 to obtain relative coordinate information R2 of the second mobile station, determining a precise coordinate d2 of the second mobile station based on R2 and the known precise coordinate d0 of the reference station; and transmitting R1, d1, R2 and d2 to the crane resolving unit.

The system in said example of the present disclosure may be implemented as a method for positioning an engineering machinery work object as shown in FIG. 6.

In the example as shown in FIG. 12, the functions of the crane resolving unit 904 and the crane controller 905 are similar to those in the example as shown in FIG. 9, which would not be repeated here.

The example as shown in FIG. 12 differs from the example as shown in FIG. 9 mainly in that: the steps of performing real-time kinematic computation to obtain the relative coordinate of the mobile station and determining the precise coordinate of the mobile station are performed by the reference station, thereby reducing the requirement on the performance of the mobile station.

In one example of the present disclosure, the reference station 901 is further used for collecting in real time satellite positioning information as a reference station current measurement value D0; determining a modification value k based on D0 and the known precise coordinate d0 of the reference station; determining precise coordinate d1 of the first mobile station based on D1 and k, determining the relative coordinate information R1 of the first mobile station based on d0 and d1; determining precise coordinate d2 of the second mobile station based on D2 and k, determining the relative coordinate information R2 of the second mobile station based on d2 and d0; and transmitting R1, d1, R2 and d2 to the crane resolving unit.

The system in said example of the present disclosure may be implemented as a method for positioning an engineering machinery work object as shown in FIG. 8.

The functional units as described above, including the carne resolving unit 904, the crane controller 905 and the like, may be implemented as a universal processor, a programmable logic controller (PLC), a digital signal processor (DSP), an application-specific integrated circuit (ASIC), a field programmable gate array (FPGA) or other programmable logic devices, discrete gates or transistor logic devices, discrete hardware components or any other suitable combinations thereof which are used for executing the functions as described in the present application.

Up till now, the present disclosure has been completely described in detail. In order to avoid shielding of the concept of the present disclosure, some details commonly known in the art are not described. Based on the above description, those skilled in the art can well understand how to carry out the technical solutions disclosed here.

Ordinary technicians in the art may understand that all or part of the steps for implementing the above examples may be performed with hardware or by a program instructing corresponding hardware, wherein the program may be stored on a computer-readable storage medium, which may be a read-only memory, a disc or a compact disc.

The description of the present disclosure is given for illustration and recitation, instead of exhaustive or limiting the present disclosure to the disclosure. Many modifications and variations are obvious to ordinary technicians in the art. Selection and description in the examples are to better illustrate principles and actual applications of the present disclosure and enable ordinary technicians to understand the present disclosure so as to design various examples with various modifications suitable for specific usages.

What is claimed is:

1. A method for positioning an engineering machinery work object, comprising:

collecting in real time, by a reference station, satellite positioning information as a reference station current measurement value D0, and transmitting D0 to a first mobile station and a second mobile station, wherein the reference station is disposed at a rotating shaft center of a crane, the first mobile station is disposed at a hoisting position of an object to be hoisted, and the second mobile station is disposed at a vehicle head of the crane;

collecting in real time, by the first mobile station, satellite positioning information as a first mobile station current measurement value D1, performing real-time kinematic processes on D0 and D1 to obtain relative coordinate information of the first mobile station, and transmitting the relative coordinate information of the first mobile station to a crane resolving unit;

collecting in real time, by the second mobile station, satellite positioning information as a second mobile station current measurement value D2, performing real-time kinematic processes on D0 and D2 to obtain relative coordinate information of the second mobile station, and transmitting the relative coordinate information of the second mobile station to the crane resolving unit;

determining, by the crane resolving unit, a boom extension length, a boom pitch angle and a boom rotating angle based on the relative coordinate information of the first mobile station and the relative coordinate information of the second mobile station; and controlling, by a crane controller, based on the boom extension length, the boom pitch angle and the boom rotating angle, the boom to move to the hoisting position of the object to hoist the object.

2. The method according to claim 1, after the step of determining, by the crane resolving unit, the boom extension length, the boom pitch angle and the boom rotating angle based on the relative coordinate information of the first mobile station and the relative coordinate information of the second mobile station, further comprising:

determining whether the boom extension length, the boom pitch angle and the boom rotating angle are within respective predetermined ranges of hoisting height, boom pitch angle and boom rotating angle;

if it is determined that the boom extension length, the boom pitch angle and the boom rotating angle are not within the respective predetermined ranges of hoisting height, boom pitch angle and boom rotating angle, outputting alarm information;

if it is determined that the boom extension length, the boom pitch angle and the boom rotating angle are within the respective predetermined ranges of hoisting height, boom pitch angle and boom rotating angle, controlling, by the crane controller, based on the boom extension length, the boom pitch angle and the boom rotating angle, the boom to move to the hoisting position of the object to hoist the object.

3. The method according to claim 1, wherein, the step of determining, by the crane resolving unit, the boom extension length, the boom pitch angle and the boom rotating angle based on the relative coordinate information of the first mobile station and the relative coordinate information of the second mobile station comprises:
  determining, by the crane resolving unit, the boom extension length and the boom pitch angle based on the relative coordinate information of the first mobile station;
  determining, by the crane resolving unit, the boom rotating angle based on the relative coordinate information of the first mobile station and the relative coordinate information of the second mobile station.

4. The method according to claim 1, wherein, the step of controlling, by the crane controller, based on the boom extension length, the boom pitch angle and the boom rotating angle, the boom to move to the hoisting position of the object to hoist the object comprises:
  during the process of controlling the boom to move to the hoisting position of the object, determining whether current boom pitch angle collected by a main arm angle sensor is within a predetermined range of boom pitch angle;
  if the current boom pitch angle is not within the predetermined range of boom pitch angle, modifying the amplitude so as to adjust the current boom pitch angle to one angle within the predetermined range of boom pitch angle;
  if the current boom pitch angle is within the predetermined range of boom pitch angle, determining whether current rotating angle collected by a rotating angle encoder is within the predetermined range of boom rotating angle;
  if the current rotating angle is not within a predetermined range of boom rotating angle, rotating the boom so as to adjust the current rotating angle to one angle within the predetermined range of boom rotating angle;
  if the current rotating angle is within the predetermined range of boom rotating angle, determining whether current extension length collected by a length sensor is within the predetermined range of boom extension length;
  if the current extension length is not within a predetermined range of boom extension length, extending the boom frame so as to adjust the current extension length to one length within the predetermined range of boom extension length;
  if the current extension length is within the predetermined range of boom extension length, hoisting the object.

5. The method according to claim 1, further comprising:
  transmitting, by the reference station, a known precise coordinate of the reference station to the first mobile station and the second mobile station;
  the first mobile station acquiring a precise coordinate of the first mobile station based on the known precise coordinate of the reference station and the relative coordinate information of the first mobile station, and transmitting the precise coordinate of the first mobile station to the crane resolving unit;
  the second mobile station acquiring a precise coordinate of second mobile station based on the known precise coordinate of the reference station and the relative coordinate information of the second mobile station, and transmitting the precise coordinate of second mobile station to the crane resolving unit.

6. An engineering machinery work object positioning system comprising a reference station, a first mobile station, a second mobile station, a crane resolving unit and a crane controller, wherein the reference station is disposed at the center of a crane rotating shaft, the first mobile station is disposed at the hoisting position of an object, and the second mobile station is disposed at the vehicle head of the crane, wherein:
  the reference station is used for collecting in real time satellite positioning information as a reference station current measurement value D0, and transmitting D0 to the first mobile station and the second mobile station;
  the first mobile station is used for collecting in real time satellite positioning information as a first mobile station current measurement value D1, performing real-time kinematic processes on D0 and D1 to obtain relative coordinate information of the first mobile station, and transmitting the relative coordinate information of the first mobile station to the crane resolving unit;
  the second mobile station is used for collecting in real time satellite positioning information as a second mobile station current measurement value D2, performing real-time kinematic processes on D0 and D2 to obtain relative coordinate information of the second mobile station, and transmitting the relative coordinate information of the second mobile station to the crane resolving unit;
  the crane resolving unit is used for determining a boom extension length, a boom pitch angle and a boom rotating angle based on the relative coordinate information of the first mobile station and the relative coordinate information of the second mobile station;
  the crane controller is used for controlling based on the boom extension length, the boom pitch angle and the boom rotating angle, the boom to move to the hoisting position of the object to hoist the object.

7. The system according to claim 6, wherein,
  the crane resolving unit is further used for determining whether the boom extension length, the boom pitch angle and the boom rotating angle are respectively within predetermined ranges of hoisting height, boom pitch angle and boom rotating angle; if the boom extension length, the boom pitch angle and the boom rotating angle are not within the predetermined ranges of hoisting height, boom pitch angle and boom rotating angle, outputting alarm information; and if the boom extension length, the boom pitch angle and the boom rotating angle are respectively within the predetermined ranges of hoisting height, boom pitch angle and boom rotating angle, instructing the crane controller to execute an operation of controlling the boom to move to the hoisting position of the object and hoist the object based on the boom extension length, the boom pitch angle and the boom rotating angle.

8. The system according to claim 6, wherein the crane resolving unit comprises a first resolving module and a second resolving module, wherein:
  the first resolving module is used for determining the boom extension length and the boom pitch angle based on the relative coordinate information of the first mobile station;
  the second resolving module is used for determining the boom rotating angle based on the relative coordinate information of the first mobile station and the relative coordinate information of the second mobile station.

9. The system according to claim 6, wherein, the crane controller comprises a first identification module, a second identification module, a third identification module and an execution module, wherein:
the first identification module is used for identifying whether the current boom pitch angle collected by a main arm angle sensor is within the predetermined range of boom pitch angle;
the second identification module is used for identifying whether the current rotating angle collected by a rotating angle encoder is within the predetermined range of boom rotating angle in case that the first identification module identifies that the current boom pitch angle is within the predetermined range of boom pitch angle;
the third identification module is used for identifying whether the current extension length collected by a length sensor is within the predetermined range of boom extension length in case that the second identification module identifies that the current rotating angle collected by a rotating angle encoder is within the predetermined range of boom rotating angle;
the execution module is used for modifying the amplitude so as to adjust the current boom pitch angle to one angle within the predetermined range of boom pitch angle in case that the first identification module identifies that the current boom pitch angle is not within the predetermined rang of boom pitch angle; rotating the boom so as to adjust the current rotating angle to one angle within the range of boom rotating angle in case that the second identification module identifies that the current rotating angle is not within the predetermined range of boom rotating angle; and extending the boom frame so as to adjust the current extension length to one length within the predetermined range of boom extension length in case that the third identification module identifies that the current extension length is not within the predetermined range of boom extension length and hoisting the object in case that the third identification module identifies that the current extension length is within the predetermined range of boom extension length.

10. The system according to claim 6, wherein, the reference station is further used for transmitting a known precise coordinate of the reference station to the first mobile station and the second mobile station;
the first mobile station is further used for acquiring a precise coordinate of the first mobile station based on the known precise coordinate of the reference station and the relative coordinate information of the first mobile station, and transmitting the precise coordinate of the first mobile station to the crane resolving unit;
the second mobile station is further used for acquiring a precise coordinate of second mobile station based on the known precise coordinate of the reference station and the relative coordinate information of the second mobile station, and transmitting the precise coordinate of second mobile station to the crane resolving unit.

11. A computer program product for positioning an engineering machinery work object, the computer program product comprising a non-transient computer usable storage medium having computer-readable program code embodied in the medium, the computer-readable program code comprising:
computer readable program code that is configured to collect in real time, by a reference station, satellite positioning information as a reference station current measurement value D0, and transmitting D0 to a first mobile station and a second mobile station, wherein the reference station is disposed at a rotating shaft center of a crane, the first mobile station is disposed at a hoisting position of an object to be hoisted, and the second mobile station is disposed at a vehicle head of the crane;
computer readable program code that is configured to collect in real time, by the first mobile station, satellite positioning information as a first mobile station current measurement value D1, performing real-time kinematic processes on D0 and D1 to obtain relative coordinate information of the first mobile station, and transmitting the relative coordinate information of the first mobile station to a crane resolving unit;
computer readable program code that is configured to collect in real time, by the second mobile station, satellite positioning information as a second mobile station current measurement value D2, performing real-time kinematic processes on D0 and D2 to obtain relative coordinate information of the second mobile station, and transmitting the relative coordinate information of the second mobile station to the crane resolving unit;
computer readable program code that is configured to determine, by the crane resolving unit, a boom extension length, a boom pitch angle and a boom rotating angle based on the relative coordinate information of the first mobile station and the relative coordinate information of the second mobile station; and
computer readable program code that is configured to control, by a crane controller, based on the boom extension length, the boom pitch angle and the boom rotating angle, the boom to move to the hoisting position of the object to hoist the object.

12. The computer program product according to claim 11, wherein, the computer-readable program code further comprises:
computer readable program code that is configured to determine whether the boom extension length, the boom pitch angle and the boom rotating angle are within respective predetermined ranges of hoisting height, boom pitch angle and boom rotating angle;
computer readable program code that is configured to output alarm information if it is determined that the boom extension length, the boom pitch angle and the boom rotating angle are not within the respective predetermined ranges of hoisting height, boom pitch angle and boom rotating angle;
computer readable program code that is configured to control, by the crane controller, based on the boom extension length, the boom pitch angle and the boom rotating angle, the boom to move to the hoisting position of the object to hoist the object, if it is determined that the boom extension length, the boom pitch angle and the boom rotating angle are within the respective predetermined ranges of hoisting height, boom pitch angle and boom rotating angle.

13. The computer program product according to claim 11, wherein, the computer readable program code configured to determine, by the crane resolving unit, the boom extension length, the boom pitch angle and the boom rotating angle based on the relative coordinate information of the first mobile station and the relative coordinate information of the second mobile station comprises:

computer readable program code that is configured to determine, by the crane resolving unit, the boom extension length and the boom pitch angle based on the relative coordinate information of the first mobile station;

computer readable program code that is configured to determine, by the crane resolving unit, the boom rotating angle based on the relative coordinate information of the first mobile station and the relative coordinate information of the second mobile station.

14. The computer program product according to claim 11, wherein, computer readable program code configured to control, by the crane controller, based on the boom extension length, the boom pitch angle and the boom rotating angle, the boom to move to the hoisting position of the object to hoist the object comprises:

computer readable program code that is configured to determine whether current boom pitch angle collected by a main arm angle sensor is within a predetermined range of boom pitch angle during the process of controlling the boom to move to the hoisting position of the object;

computer readable program code that is configured to modify the amplitude so as to adjust the current boom pitch angle to one angle within the predetermined range of boom pitch angle if the current boom pitch angle is not within the predetermined range of boom pitch angle;

computer readable program code that is configured to determine whether current rotating angle collected by a rotating angle encoder is within the predetermined range of boom rotating angle if the current boom pitch angle is within the predetermined range of boom pitch angle;

computer readable program code that is configured to rotate the boom, by a crane controller, so as to adjust the current rotating angle to one angle within the predetermined range of boom rotating angle if the current rotating angle is not within a predetermined range of boom rotating angle;

computer readable program code that is configured to determine whether current extension length collected by a length sensor is within the predetermined range of boom extension length if the current rotating angle is within the predetermined range of boom rotating angle;

computer readable program code that is configured to extend the boom frame, by a crane controller, so as to adjust the current extension length to one length within the predetermined range of boom extension length if the current extension length is not within a predetermined range of boom extension length; and computer readable program code that is configured to hoist the object, by a crane controller, if the current extension length is within the predetermined range of boom extension length.

15. The computer program product according to claim 11, wherein, the computer-readable program code further comprises:

computer readable program code that is configured to transmit, by the reference station, a known precise coordinate of the reference station to the first mobile station and the second mobile station;

computer readable program code that is configured to acquire, by the first mobile station, a precise coordinate of the first mobile station based on the known precise coordinate of the reference station and the relative coordinate information of the first mobile station, and transmitting the precise coordinate of the first mobile station to the crane resolving unit;

computer readable program code that is configured to acquire, by the second mobile station, a precise coordinate of second mobile station based on the known precise coordinate of the reference station and the relative coordinate information of the second mobile station, and transmitting the precise coordinate of second mobile station to the crane resolving unit.

* * * * *